Feb. 22, 1927.
W. HEFTI
1,618,335
COMPRESSED AIR INSTALLATION FOR INTERNAL COMBUSTION ENGINES ON BOARD SHIPS
Filed Jan. 23, 1924
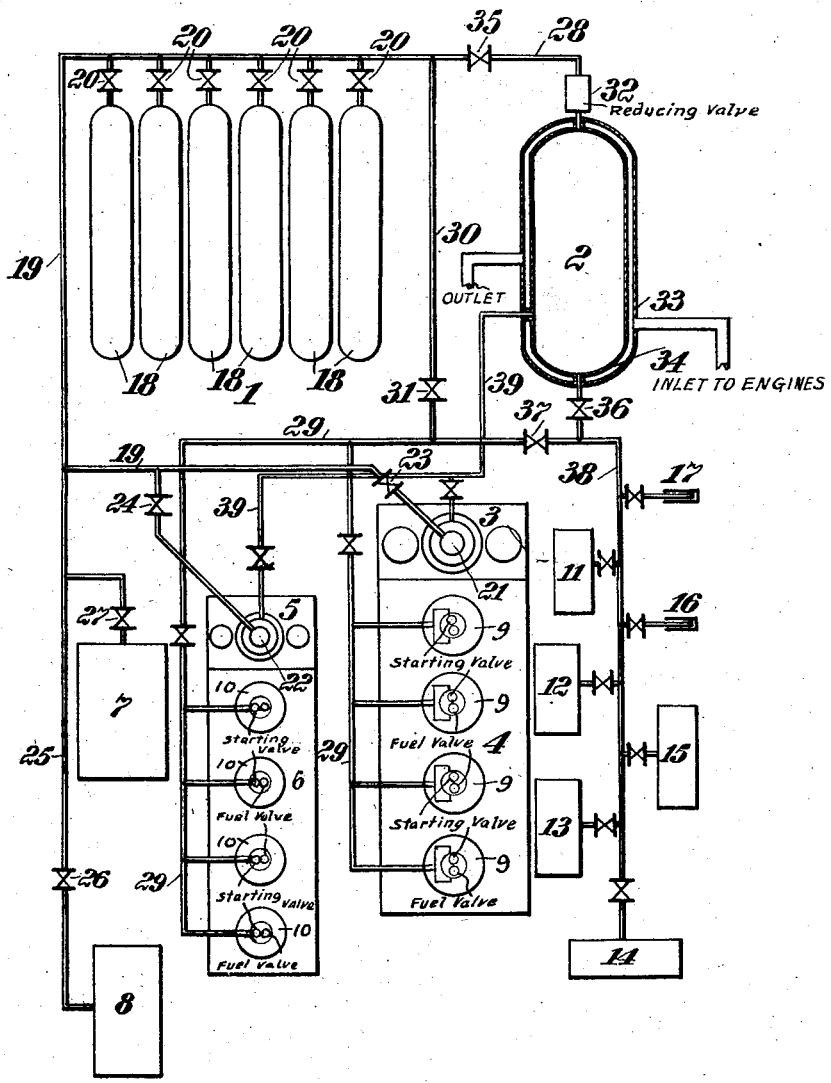

Patented Feb. 22, 1927.

1,618,335

UNITED STATES PATENT OFFICE.

WILHELM HEFTI, OF WULFLINGEN, SWITZERLAND, ASSIGNOR TO THE FIRM OF GEBRUDER SULZER AKTIENGESELLSCHAFT, AT WINTERTHUR.

COMPRESSED-AIR INSTALLATION FOR INTERNAL-COMBUSTION ENGINES ON BOARD SHIPS.

Application filed January 23, 1924. Serial No. 688,112.

This invention relates to a compressed air installation for internal combustion engines on board ships.

According to the invention at least two air accumulators are provided for storing air at different pressures received from the same pumps, one storage vessel accumulator containing high-pressure air for fuel-injection purposes and starting at high-pressures and the other air at a lower pressure for starting the engines at low pressures and for driving auxiliary engines and machinery, such as starting engines, barring engines, lubricating oil pumps, cooling-water pumps, steering gear, etc.

It is advantageous to allow the pumps to deliver air to the high-pressure accumulator or air vessel and to lead the air from this vessel into that in which air at a lower pressure is stored.

If multi-stage pumps are used, the individual air vessels or accumulators may be charged at different pressures directly from the pump by takng air from the different stages direct to the accumulators or storage vessels. Valve-members can also be provided to allow of air being drawn from the storage vessels at different pressures for driving one and the same machine.

In order that the air may be let off from the high-pressure accumulator as desired, the low-pressure accumulator can be fitted with corresponding members. It is also preferable to arrange a device to allow of the low-pressure accumulator being heated.

In addition to the air compressors driven by the main and auxiliary engines, the auxiliary compressor and the emergency compressor may also supply air to the high-pressure accumulator, when the individual compressors supplying air can be put into or out of service as desired. This arrangement of plant and valves is especially recommendable in installations consisting of a compressor driven by the main engine, a compressor driven by the auxiliary engine, an auxiliary engine, compressor and an emergency compressor. In such installations it is also an advantage if the high-pressure stages of the compressors driven by the main and auxiliary engines, the auxiliary compressor and the emergency compressor deliver air to the high-pressure storage vessel, whilst the intermediate stage of the compressors driven by the main and auxiliary engines deliver air to the low-pressure accumulator. This arrangement of the plant and of the valves on the air storage vessels and compressors can also be chosen so that any individual machine or storage vessel may be put into or out of service as desired.

The invention will be described in detail with reference to the accompanying drawing which shows the invention diagrammatically.

A high-pressure air storage or accumulator 1 and a low-pressure air storage or accumulator 2 are filled with compressed air by the compressor 3 driven by the main engine 4, by the compressor 5 driven by the auxiliary engine 6, by the auxiliary compressor 7 and by the emergency compressor 8. The compressed air is from there led to the place where it is utilized, for example to the cylinders 9 of the main engine, the cylinders 10 of the auxiliary engine, the reserve lubricating-oil pump 11, the starting engine 12, the barring engine 13, the steering gear 14, the reserve cooling-water pump 15, the oil burner 16, the syren 17, etc.

The main source of compressed air to be considered is the high-pressure storage or accumulator 1. As shown in the drawing, this may consist of several bottles 18 to which the compressed air is delivered through a pipe 19 which is fitted with regulating members preferably shut-off valves 20 and connected with the high-pressure stages 21 and 22 of the compressor driven by the main engine and the auxiliary engine respectively. Other shut-off valves 23 and 24 fitted in the pipe 19 allow of the compressors being connected up to or disconnected from the bottles. If the auxiliary compressor 7 or the emergency compressor 8 is called on to supply compressed air, this air is supplied to the high-pressure bottles through a pipe 25 fitted with shut-off valves 26 and 27.

As a rule the air stored under high-pressure is led through the pipe 28 and the low-pressure storage vessel to the main pipe 29 from which it is distributed by separate pipes leading to the places where it is utilized. In case the low-pressure storage vessel must be put out of service, or if air at a higher pressure is required, such air can be obtained through a pipe 30, in which a shut-off valve 31 is fitted, and which connects the high-pressure storage direct with the main pipe 29.

The low-pressure vessel or accumulator is represented on the drawing as a simple container 2, before which a reducing valve 32 is fitted. The low pressure storage vessel can of course be designed and constructed in any other manner as desired. The container 2 is enclosed in a casing 33, thereby forming a hollow space 34 which can be used as a heating jacket. The low-pressure accumulator can in this way be heated either by exhaust gases passed through the jacket or by hot cooling-water from the internal-combustion engine cylinder-jackets, or by any other means. Preferably the pressure-reducing valve 32 is of the known throttle valve type. By means of shut-off valves 35 and 36 fitted in the piping, the low-pressure accumulator can be cut out from the rest of the compressed air system. In order to allow of the high-pressure and low-pressure accumulators both working at the same time, another shut-off-valve 37 is provided, which preferably, as shown in the diagrammatic sketch, is arranged between the by-pass 30 and the pipe 38 which leads the low-pressure air to the place where it is utilized.

To this piping the following machinery is connected and arranged so that it can be connected or disconnected by means of valves,—the reserve lubricating-oil pump 11, the starting engine 12, the barring engine 13, the steering gear 14, the reserve cooling-water pump 15, the oil-burner 16 for heating purposes etc., the syren 17, and other machinery and apparatus, not shown in the drawing, which can be driven by compressed air.

The low pressure accumulator can also be connected direct by means of the pipes 39 with the intermediate stage of the compressors driven by the main and auxiliary engines. The injection-air bottles can also be connected with the high-pressure storage by means of the pipe 19.

The installation is operated as follows:—

When, for example, a main engine or an auxiliary engine, or any of the machines or engines connected with the distributing piping are to be started up, air is allowed to flow from the low-pressure accumulator 2 by opening the valve 36. In consequence of the fall of pressure in the low-pressure accumulator the reducing valve 32 opens and allows air to pass from the high-pressure accumulator into the low-pressure through the opened shut-off-valves 20 and 35. As soon as the pressure in the low-pressure storage vessel has been restored to normal, the reducing valve closes and only opens again later if the pressure again drops in consequence of air having been drawn off. The low-pressure accumulator can also be put out of service, and in this case compressed air is taken through the by-pass piping 30 to the place of use and the air required for starting the engines and driving the auxiliary machinery is taken direct from the high-pressure storage.

By fitting the requisite members it is also possible to arrange to work the installation in such a way that the part of the plant requiring compressed air, for example for starting or for fuel injection, can be worked with high-pressure air from the high-pressure accumulator whilst at the same time air at lower pressure can be led from the low-pressure accumulator to places where low-pressure air is required, for example for the reserve lubricating-oil pumps, reserve cooling-water pumps, etc.

The air in the high-pressure and low-pressure storage vessels may be renewed in various ways. Preferably the air required for the high-pressure storage is drawn from the high-pressure stages of the compressors driven by the main and auxiliary engines or from the auxiliary or emergency compressors. When filling the accumulators for the first time, or when the pressure in them has fallen abnormally low, air can be taken from the intermediate stage of the compressors driven by the main or auxiliary engines and led direct to the low-pressure accumulator. If the latter is filled in this manner, a saving of energy is effected and the draw-back of the air cooling down when it flows at a high pressure into the air bottles and there expands greatly, is avoided.

The pressure in the low-pressure accumulator is preferably chosen so that it is high enough to start up the main engines, but, on the other hand, is low enough so that not too much is required and no great cooling of the cylinder space takes place.

The size of the low-pressure accumulator is based on the consideration that the air which is cooled when flowing over warms up somewhat before reaching the place where it is used, and that for normal working a stock of air warmed to about the temperature of the engine-room is always ready at low-pressure.

It will be understood that the individual elements of the combination are well known, but that the construction described in the foregoing is one of the many possible combinations by which an installation may be obtained which is not only simple to construct, but also insures reliability of operation and permits operation to be effected from either of the systems of compressed air.

I claim:

1. In a compressed air installation for internal combustion engines on ship board the combination with an internal combustion engine driven multi-stage air compressor and auxiliary and emergency air compressors of a high pressure air accumulator, a low pressure air accumulator, means for connecting said low pressure accumulator to the intermediate pressure stage of said multi-stage compressor, means for connecting said high pressure accumulator to the high pressure stage of said multi-stage compressor, and to the auxiliary and emergency air compressors, an automatic pressure-reducing valve between said accumulators, means for supplying compressed air from said high pressure accumulator to the fuel and starting valves of the internal combustion engine driving said multi-stage compressor, means for connecting said low pressure accumulator to auxiliary machinery, means for connecting said high pressure accumulator to auxiliary machinery, and means for controlling the connection of both the high and the low pressure accumulator to said auxiliary machinery.

2. In a compressed air installation for internal combustion engines on ship board the combination with a main and a secondary internal combustion engine driven multi-stage air compressor and auxiliary and emergency air compressors of a high pressure air accumulator, a low pressure air accumulator, means for connecting said low pressure accumulator to the intermediate pressure stage of said multi-stage compressors, means for connecting said high pressure accumulator to the high pressure stage of said multi-stage compressors, and to the auxiliary and emergency air compressors, an automatic pressure-reducing valve between said accumulators, means for supplying compressed air from said high pressure accumulator to the fuel and starting valves of the internal combustion engine driving said multi-stage compressors, means for connecting said low pressure accumulator to auxiliary machinery, and means for controlling the connection of both the high and the low pressure accumulator to said auxiliary machinery.

3. In a compressed air installation for internal combustion engines on ship board the combination with an internal combustion engine driven by multi-stage air compressor and auxiliary and emergency air compressors of a high pressure air accumulator, a low pressure air accumulator, means for heating said low pressure air accumulator, means for connecting said intermediate pressure accumulator to the low pressure stage of said multi-stage compressor, means for connecting said high pressure accumulator to the high pressure stage of said multi-stage compressor, and to the auxiliary and emergency air compressors, an automatic pressure-reducing valve between said accumulators, means for supplying compressed air from said high pressure accumulator to the fuel and starting valves of the internal combustion engine driving said multi-stage compressor, means for connecting said low pressure accumulator to auxiliary machinery, means for connecting said high pressure accumulator to auxiliary machinery, and means for controlling the connection of both the high and the low pressure accumulator to said auxiliary machinery.

4. In a compressed air installation for internal combustion engines on ship board the combination with a main and a secondary internal combustion engine driven multi-stage air compressor and auxiliary and emergency air compressors of a high pressure air accumulator, a low pressure air accumulator, means for heating said low pressure air accumulator, means for connecting said low pressure accumulator to the intermediate pressure stage of said multi-stage compressors, means for connecting said high pressure accumulator to the high pressure stage of said multi-stage compressors, and to the auxiliary and emergency air compressors, an automatic pressure-reducing valve between said accumulators, means for supplying compressed air from said high pressure accumulator to the fuel and starting valves of the internal combustion engine driving said multi-stage compressors, means for connecting said low pressure accumulator to auxiliary machinery, and means for controlling the connection of both the high and the low pressure accumulator to said auxiliary machinery.

5. In a compressed air installation for internal combustion engines on ship board the combination with a main and a secondary multi-cylinder internal combustion engine driven, multi-stage air compressor and auxiliary and emergency air compressors of a high pressure air accumulator, a double walled low pressure air accumulator, means for connecting said low pressure accumulator to the intermediate pressure stage of said multi-stage compressors, means for connecting the high pressure accumulator to the high pressure stage of said multi-stage compressors and to the auxiliary and emergency air compressors, an automatic pressure-reducing valve between said accumulators, means for supplying heat from the internal combustion engines to the space between the inner and outer walls of said low pressure accumulator, means for supplying compressed air from said high pressure accumulator to the fuel and starting valves of each cylinder of the engines driving said multi-stage compressors, means for connecting said low pressure accumulator to auxiliary machinery, means for connecting said high pressure accumulator to auxiliary machinery, and means for controlling the connection of both the high and the low pressure accumulator to the auxiliary machinery.

In testimony whereof I have affixed my signature.

WILHELM HEFTI.

CERTIFICATE OF CORRECTION.

Patent No. 1,618,335.                  Granted February 22, 1927, to

WILHELM HEFTI.

It is hereby certified that error appears in the printed specification of the above numbered patent requiring correction as follows: Page 1, line 24, for the misspelled word "takng" read "taking"; line 47, strike out the word and comma "engine," and line 57, for the word "This" read "The"; page 3, line 60, claim 3, strike out the word "by"; and that the said Letters Patent should be read with these corrections therein that the same may conform to the record of the case in the Patent Office.

Signed and sealed this 12th day of April, A. D. 1927.

Seal.

M. J. Moore,
Acting Commissioner of Patents.